United States Patent [19]

Keach

[11] 4,075,668
[45] Feb. 21, 1978

[54] DIGITAL LOGIC CONTROL FOR AUDIO VISUAL PROGRAMS AND METHOD THEREFOR

[75] Inventor: Bernard C. Keach, Torrance, Calif.

[73] Assignee: Educational Electronics of California Inc., Inglewood, Calif.

[21] Appl. No.: 642,051

[22] Filed: Dec. 18, 1975

[51] Int. Cl.² .................... G03B 31/00; G11B 31/00; G09B 1/00; G03B 21/00
[52] U.S. Cl. ........................................ 360/80; 35/8 A; 353/15
[58] Field of Search ............. 353/15; 352/17; 35/8 A; 360/80

[56] References Cited

U.S. PATENT DOCUMENTS

| | | | |
|---|---|---|---|
| 2,787,669 | 4/1957 | Flan et al. | 35/8 A |
| 3,756,715 | 9/1973 | Naf | 360/80 |
| 3,881,185 | 4/1975 | Broline | 353/15 |

OTHER PUBLICATIONS

Telex Brochure, Instructional Cassette Equipment, 10/73.

Primary Examiner—Steven L. Stephan
Attorney, Agent, or Firm—Wilkinson, Mawhinney & Theibault

[57] ABSTRACT

The present disclosure is directed to a logic control system for maintaining sync between an audio tape program and a slide or film projector by adding a signal track to the tape on which is recorded a tape stop signal and projector frame change signal which through a digital logic control circuit synchronization between the audio and visual components is preserved irrespective of tape speed or direction.

6 Claims, 8 Drawing Figures

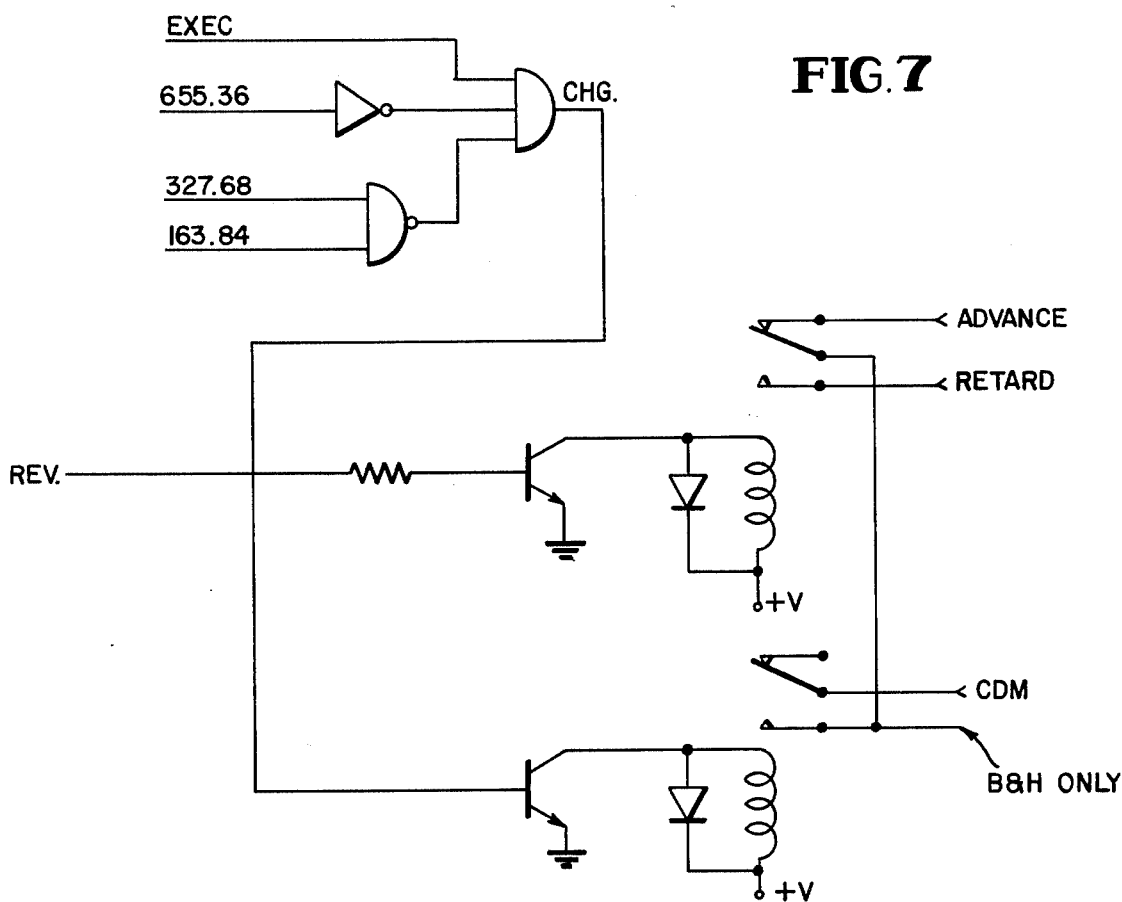
FIG.7
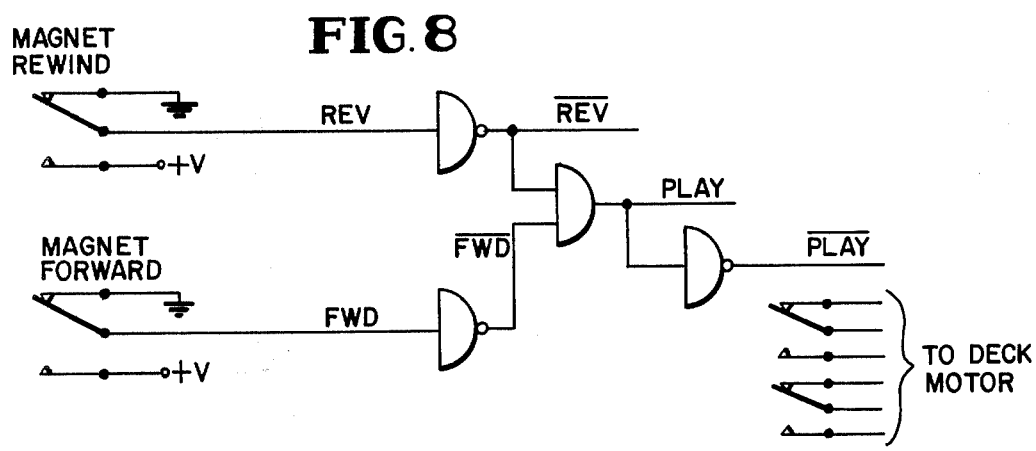
FIG.8
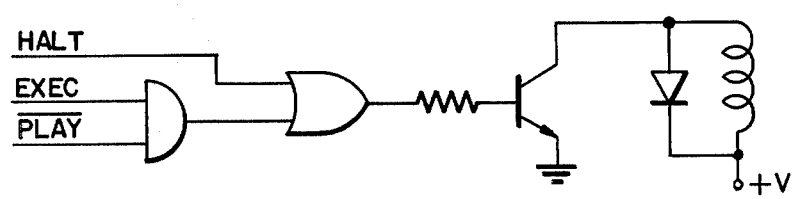

DIGITAL LOGIC CONTROL FOR AUDIO VISUAL PROGRAMS AND METHOD THEREFOR

THE PRIOR ART

There are many devices available which present an audio program or narration by means of a disc or magnetic tape and simultaneously control a slide or film projector which projects scenes and visuals associated with and relevant to the narration. Many such devices use various frequency pulses of specific time duration and modulation to control more than one projector or device and in some instances to also cause the tape player to stop or pause. These devices have been limited in scope in that the slide and narration synchronization is lost in the event the tape player is reversed to review a portion of the narration or fast forwarded to skip over a section of the program. The best prior art of which I am aware are U.S. Pat. Nos. 3,700,319; 3,809,467; 3,447,864; 3,177,767; 3,110,216; 3,612,675 and 2,811,588.

An object of the present invention is to provide the operator of a synchronized presentation with the ability to back up and replay an entire program or a portion of it by rewinding the tape alone.

A further object of this invention is to permit the observer of a synchronized program to skip over a portion of the program by merely fast fowarding the tape to the desired point.

Another object of this invention is to permit a student using a synchronized program in a learning situation to review or skip ahead in the program by merely rewinding or fast forwarding the tape accordingly.

A further object of this invention is to permit a programmer or producer of foreign language materials to include visuals with his recorded material since "review" which is a requisite part of language study is now possible as is cueing of the material.

Another object of this invention is to provide an inexpensive means of detecting the various possible control signals and performing the necessary operations regardless of the tape speed and direction.

Another object of this invention is to reduce the cost of such a device by its being compatible with most standard film and slide projectors.

A still further object of this invention is to be compatible with the American National Standards Institute Standard PH7.4 or any standard or pulsing method which defines frequency and allowable drift or excursion, pulse duration and upper and lower limits and pulse modulations and allowable tolerances.

With the foregoing and other objects in view the invention will be more fully described hereinafter and more particularly pointed out in the appended claims.

In the drawings in which like parts are denoted by reference characters throughout the several views:

FIG. 7 is a schematic showing application of the system of the present invention for both slide projectors and filmstrip projectors.

FIG. 8 is a schematic showing relay control for halting and pausing the tape deck.

GENERAL DESCRIPTION

Figure 1:
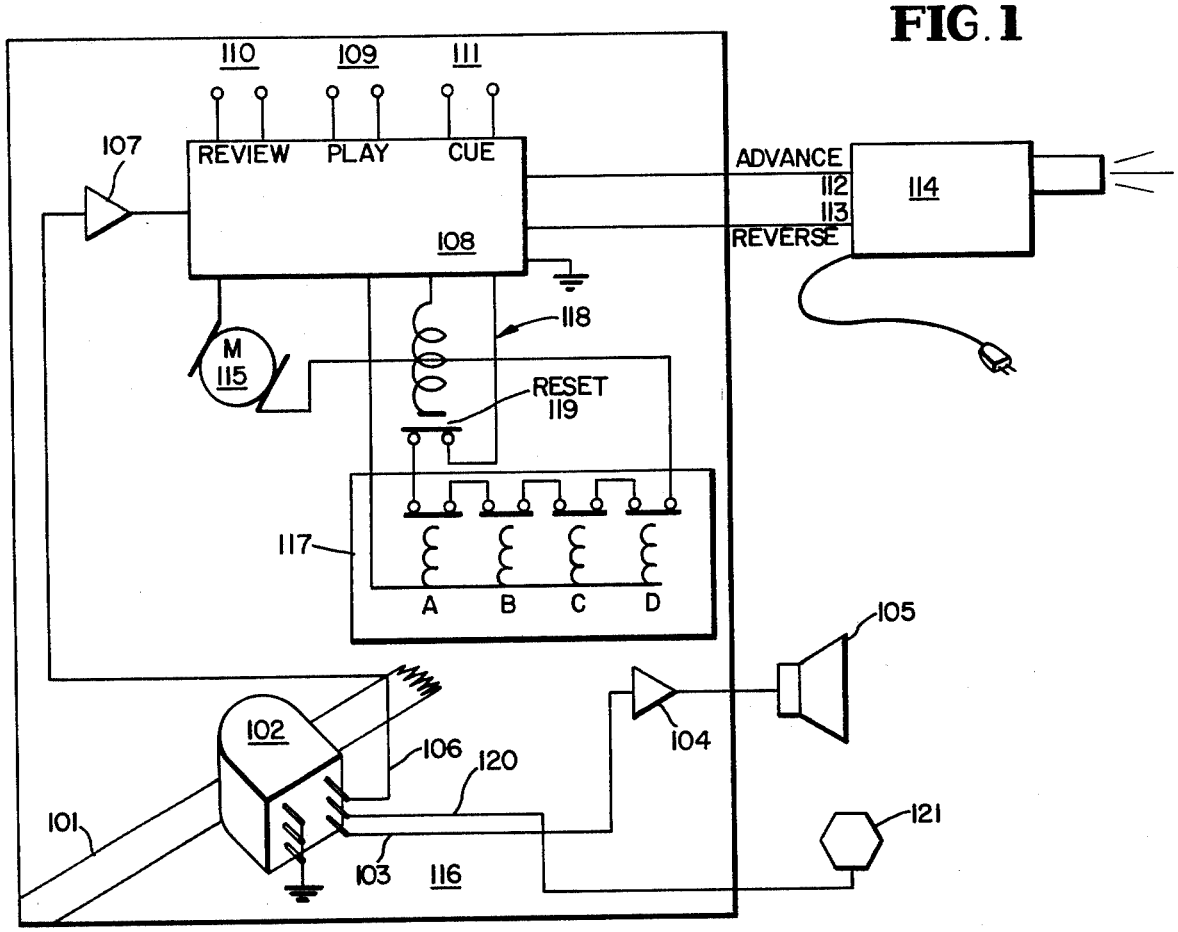
FIG. 1 is a schematic view of the digital logic control system of the present invention applied to a sound tape deck and slide projector.

Referring now to FIG. 1 which is a pictorial presentation of the manner in which this invention operates, the tape player 116 is a standard tape mechanism such as a cassette transport incorporating a logic 108 which is basically a counter, clock and compartor. If the control pulse scheme is similar to ANSI Standard PH7.4 then all pulses may be identified by the number of cycles in the pulse and electronic logic may be used to accomplish this function and decriminate and identify pulses.

The cassette incorporates a playback head 102 which has separate poles, 103, 106, and 120. When in PLAY 109, the tape 101 passes head 102 and the audio narrative is detected by one pole piece 103 and the signal is fed to amplifier 104 which in turn drives a speaker or headphone 105. When a control pulse is detected by pole piece 106, it is fed to amplifier 107 which in turn feeds it to the logic circuit 108 which is also receiving a signal from play switch 109 indicating to the logic that the cassette is in play. If the detected control signal is an advance pulse, the logic 108 identifies it and sends an advance command to advance projector terminal 112 and the projector 114 advances one slide. If the detected control signal is a pause or stop pulse, the logic 108 opens the power supply line 118 through switch 119 to motor 115 and the cassette stops until reset button 119 is depressed by the operator. Should the pause or stop command be modulated for answer code purposes, the logic 108 then opens the appropriate answer code reset button in answer bank 117 and the motor will not start until the proper answer button is depressed.

When the cassette 116 is in PLAY with the play button 109 depressed, the tape 101 is in full contact with the playback head 102. IF, while in this condition the review tab is depressed, the review switch 110 is actuated, along with play switch 109, further the tape 101 is moved slightly away from head 102. The tape 101 is however, in sufficient contact with playback head 102 for audio and control signals to be detected. Should an advance signal on tape 101 now pass head 102, it will be detected by pole piece 106 although as a higher frequency; however, the number of cycles in the pulse will not change and the logic counts cycles to determine the type of command detected. Although the frequency had effectively increased due to tape speed, amplifier 107 is broad band enough to pass this signal to logic 108, where the cycles within the pulse are counted and 114. However, the review switch 110 is activated and the logic 108 directs a pulse to reverse projector terminal 113 causing projector 114 to reverse one slide. Further, since the projector takes a finite amount of time to actuate and change slides, the coincidence of the detected advance pulse and the actuation of review switch 110 causes the logic 108 to stop and dynamically brake motor 115 for a short period of time. This period is adjustable to match the projector 114 characteristics. In a similar manner the cue tab may be depressed instead of review and the same sequence of events occurs except the logic 108 received a signal from CUE 111 and consequently causes the projector 114 to advance one slide.

If the control pulse which is detected is identified by logic 108 as a pause or stop pulse, it then is ignored since the review switch 110 or cue switch 111 is activated as well as play switch 109 and the logic 108 ignores the stop or pause command. The same sequence occurs in the event that the pause or stop tone were modulated for answer coding. Other pulses or different frequencies may also be used to generate different assignable commands. The limit is determined by center frequency and limits, and pulse duration and limits such that the count of cycles may be low due to poor signal level, tape dropout and interference and the logic can still differentiate between pulses. Such limits are determined by quality of the mechanism, tape, magnetic heads and electronics.

An additional pole piece 120 can be added to head 102 for recording purposes. This enables the operator to speak into microphone 121 and record his response to a stimulus detected and played back through his headset or speaker 105. The operator can then rewind and compare his response to the stimulus such as in the case of language, speech or music study. As described above, the visual presentation would always be synchronized with the stimulus, therefore enhancing the presentation. Such a study arrangement has not been economically feasible in the past.

CIRCUIT DESCRIPTION

The purpose of this device is to control the presentation of visual material by means of tones recorded on magnetic tapes. Heretofore, this was generally done by differentiating between tones of different frequencies by means of analog filters. A serious drawback exists if the tape is moved at a speed different from the original recorded speed. By using digital techniques for tone recovery and identification, the visual material can be controlled irrespective of tape speed, thus allowing both sound and picture to remain always in synchronism; even if the tape device is placed in high speed forward or rewind.

The basic system allows for three functions:
1. Stop tape
2. Advance Visual Material
3. Reverse Visual Material The system described herein is designed to provide the above functions using either slide or filmstrip projectors in which a frame of visual information is presented and held for a period of time while a narration progresses on magnetic tape. From time to time, the tape may be required to stop. This is particularly true in a learning environment wherein, the student must be able to study a picture for any length of time that he deems necessary. The described system requires a manual restart from this condition, however, this could be made automatic (such as a restart after a period of time).

In the normal "PLAY" condition, the visual material is advanced one frame each time it is commanded from the tape. This is also true if the tape is in fast forward. If the tape is in rewind, the visual material must be reversed one frame for each change command received.

In this system, a tone of 150 Hz is used as a stop tone; and a tone of 1000 Hz is used as a change tone. When the magnetic tape is prepared, these tones are recorded on a dedicated track at the desired points in the program. Each tone, when recorded, is recorded for approximately four-tenths of a second. (Devices to do this are readily available commercially). Thus the stop tone will last approximately 60 cycles and the change tone 400. It is this difference (60 to 400) which enables the digital logic to separate the two signals.

Figure 2:
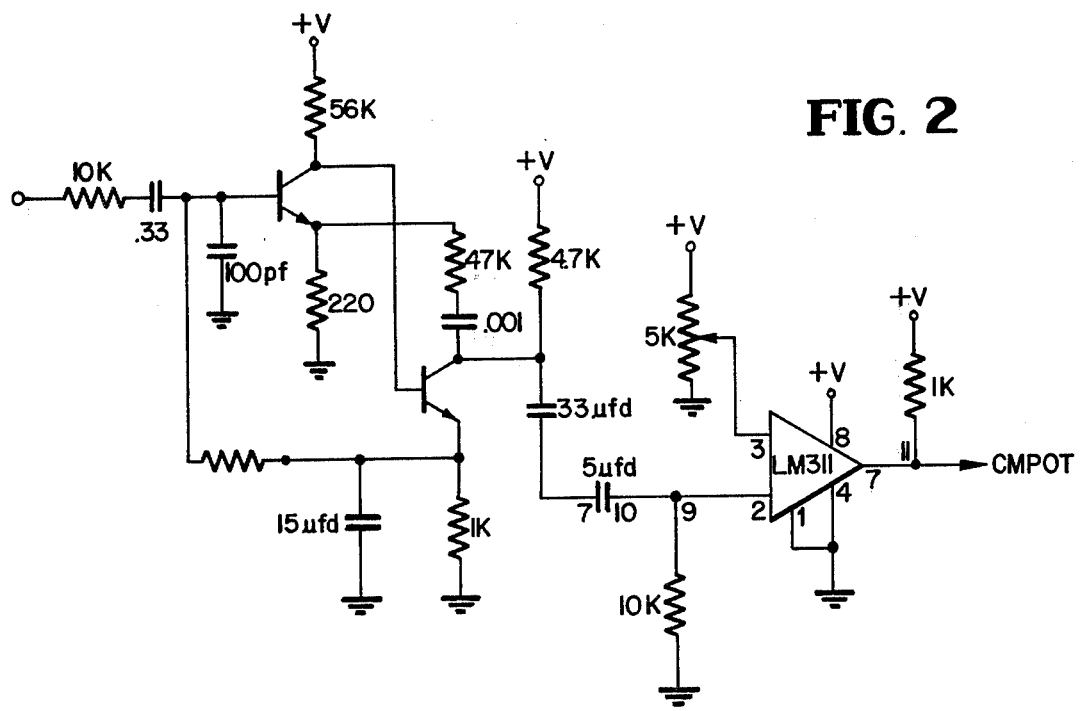
FIG. 2 is a schematic of the audio amplifier which retrieves the tone signal track from the tape.

Referring now to FIG. 2 which shows an ordinary audio amplifier which retrieves the tone track from tape. The output of this amplifier is coupled to a voltage comparator (LM311). The output of the LM311 will be at logic "0" (i.e. 0 volts) as long as the input is less than the threshold level as determined by the 5K potentiometer. Whenever the signal passes the threshold, the output CMPOT will go to logic 1. Thus CMPOT is a digital representation of the positive going half cycles of the control tones.

Figure 3:
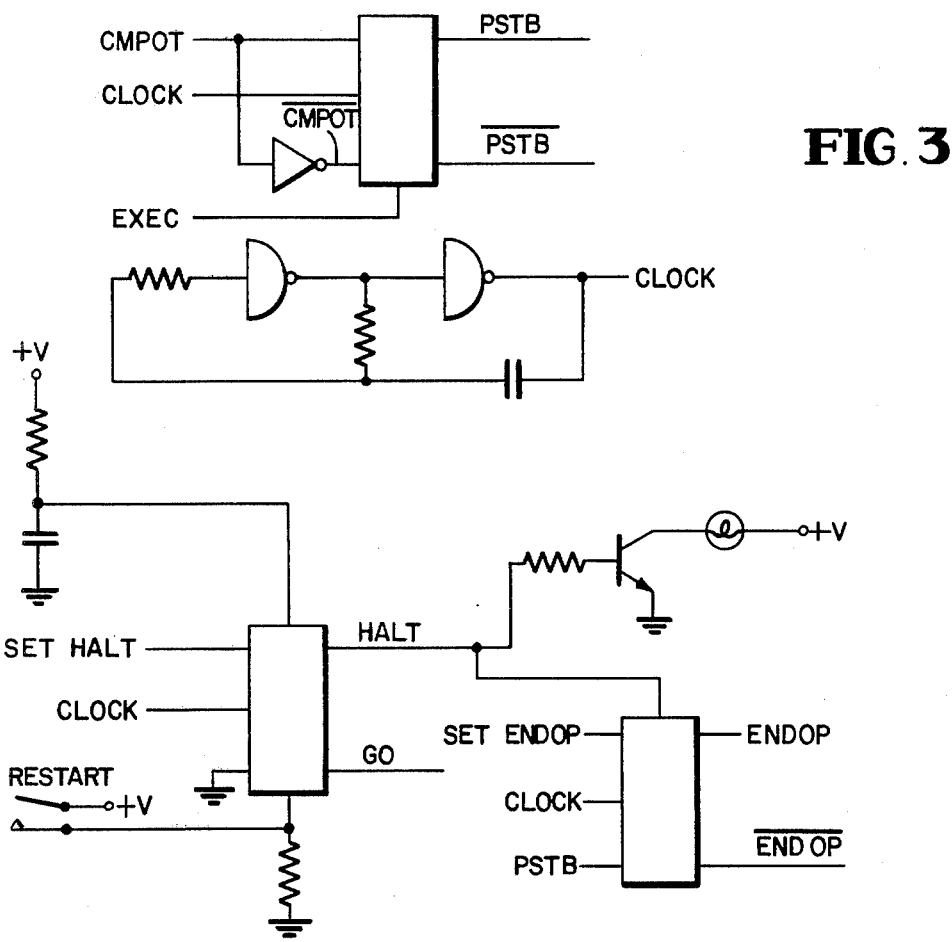
FIG. 3 is a schematic of the RC oscillator and control flip-flops.

As shown in FIG. 3 the RC oscillator (CLOCK) has a frequency of oscillation which is 100 Hz. Also shown in FIG. 3 are two control flip-flops, HALT/GO and ENDOP. An RC circuit provides a momentary pulse when power is first applied to the jam set input of the HALT/GO flip-flop. Thus when powered on, the unit comes up in a HALT state. The unit can only be placed in the GO state by the front panel push button labeled RESTART. The transistor on the HALT output is used to drive a front panel indicator. The HALT signal is used to jam set the ENDOP flip-flop. The term PSTB resets ENDOP. PSTB is the output of the flip-flop whose inputs are the terms CMPOT and CMPOT. This flip-flop is clocked by CLOCK. PSTB simply tracks CMPOT in synchronism with the system clock (CLOCK). Notice that PSTB is held reset by EXEC which will be explained later.

Figure 4:
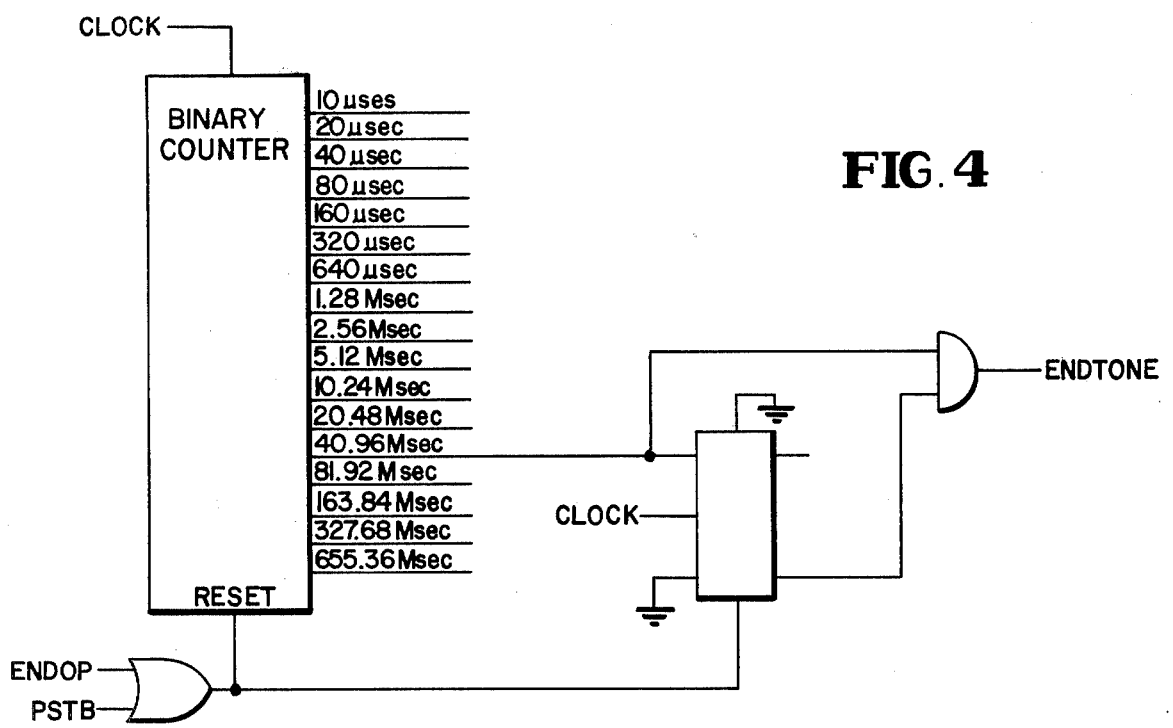
FIG. 4 is a schematic of the binary counter which counts clock pulses from the circuit of FIG. 3.

As shown in FIG. 4 a binary counter is constantly attempting to count the CLOCK pluses. Since the clock period in 10 micro-seconds, each state is labeled according to the time it takes for that stage to go true after the counter has been reset to all zeroes. The reset of the counter is an or function made up of ENDOP and PSTB. ENDOP is initially true, hence the counter is held at all zeroes. As the tape moves, the first PSTB resets ENDOP thus allowing the counter to count CLOCK. However, before the counter has progressed very far another PSTB occurs resetting it back to zero. This process continues throughout the tone burst, however, when the tone ends, there will no longer be any reset terms and the counter will simply continue to count.

Since the lowest frequency encountered is 150 Hz in play speed, an absence of PSTB for a period of time denotes the end of any tone burst. To allow for drop out etc. the term 40.96 msec is used. Thus when 40.96 msec goes true and end of tone is recognized. The flip-flop shown in FIG. 4 is held reset whenever the counter is reset. Thus when 40.96 msec finally goes true, there will be a one clock pulse period before it sets the flip-flop. The and gate ENDTONE detects this condition and generates a one clock pulse period signal.

Figure 5:
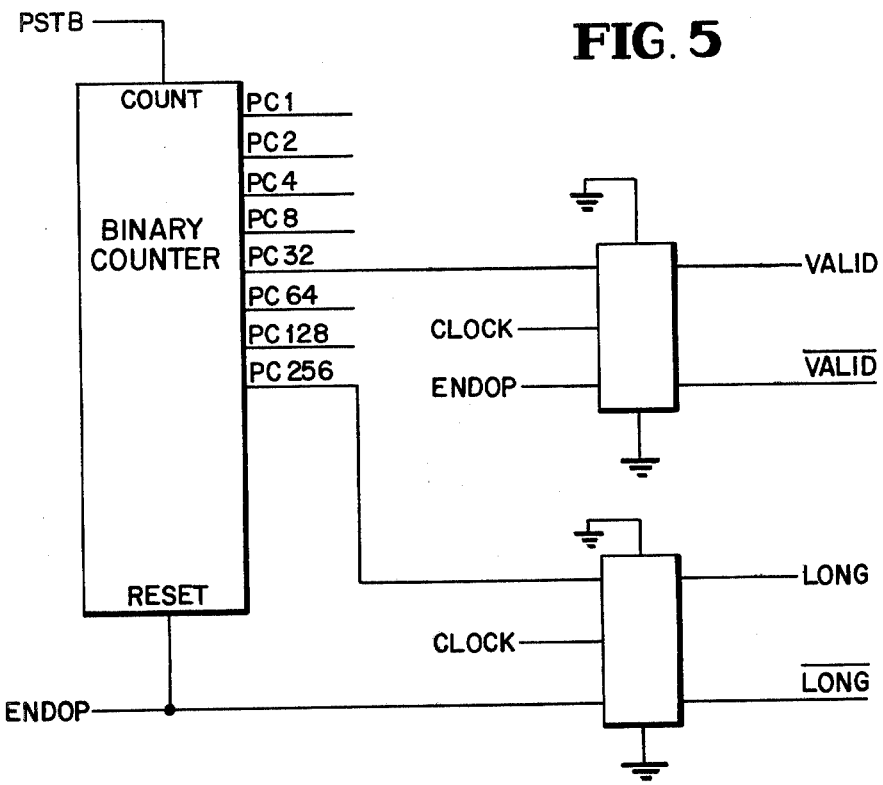
FIG. 5 is a schematic of another counter which counts PSTB pulses.

As shown in FIG. 5 a binary counter counts PSTB pulses. When ENDOP is true, the counter is held reset. As tones are encountered, on tape, the first PSTB resets ENDOP thus allowing the counter to count PSTB pulses. If at least 32 pulses are encountered, this fact is saved in the VALID flip-flop. If at least 256 pulses are encountered, this fact is saved in the LONG flip-flop. Then ENDTONE occurs these two flip-flops are monitored to determine the action to be taken.

If VALID is not true, then the PSTB pulses were considered to be noise and are disregarded. (The minimum valid signal is 60 pulses). If VALID is true, LONG is sampled. If LONG is false, it was a stop tone; if LONG is true, it was a change tone.

Figure 6:
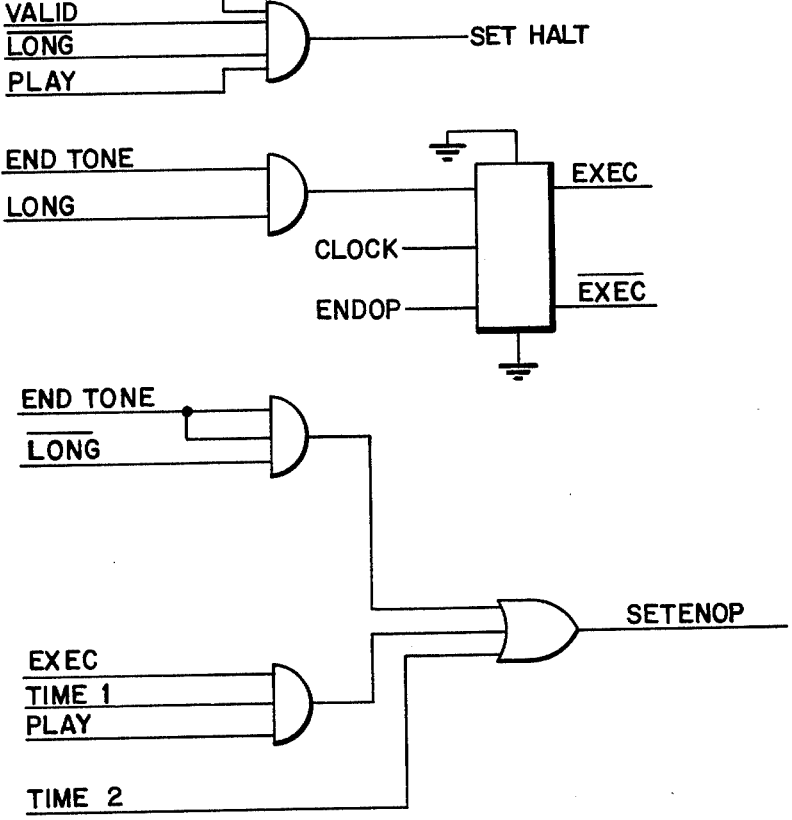
FIG. 6 is a schematic of the logic gating for final execution of the command.

As shown in FIG. 6 which is the logic gating for final execution of the command, if the tone was VALID and not LONG and the unit was in PLAY, ENDTONE causes the SETHALT signal which causes the machine to halt.

If the tone was VALID and LONG, ENDTONE sets the EXEC flip-flop. This will eventually cause the change signal to the projector. Since remote control of a projector normally requires picking and dropping relays, the term EXEC is used to hold PSTB reset. Thus noise generated by the relays will not cause spurious PSTB pulses to occur. If the tone was not LONG, it was either a stop or noise. In either case, ENDTONE causes ENDOP to be set to await the next tone burst.

In the case where EXEC was set, ENDOP must be set at the end of the operation. In most cases, the projector cannot track slide changes when the tape is in fast forward or rewind. It is thus necessary to pause the tape momentarily while the projection changes. If the unit is in PLAY, there is no need to pause it. The binary counter shown in FIG. 4 continues to count after ENDTONE. Thus its outputs become convenient terms to time off the projector changes. On FIG. 6, the terms TIME 1 and TIME 2 can be derived from the counter. If the terms 163.84 msec and 327.68 msec are anded together, a term TIME 1 correct to change most projectors is derived. The pause period for most projectors is approximately 1 second, hence the terms 327.68 msec and 655.36 msec can be anded together to make TIME 2.

The terms used in this description REV (deck in reverse), PLAY, PLAY are derived from the tape unit. Since many tape units do not provide status outputs, one technique is to attach magnets to the REWIND and FAST FORWARD buttons. When not depressed, they hold proximity relays picked. When a button is depressed, its associated relay drops out. This is shown in FIG. 8.

Notice in FIG. 8 that play is the and of REV and FWD. Thus PLAY is true even when the deck is halted. This presents no problem since everything is triggered from ENDTONE which can only occur from signals read while the deck is in motion. This Figure also shows the relay for halting and pausing the tape deck. The actual wiring is deck dependent. Notice that the pause signal is EXEC and PLAY. Remember that EXEC stays on from ENDTONE to ENDOP. Thus the deck will pause for the proper amount of time for any particular projector slide change characteristics.

FIG. 7 also shows control wiring for a Carousel slide projector and a Bell & Howell filmstrip projector. The logic will provide simultaneous signals to operate either one.

What I claim is:

1. For use with a visual projector having a photographic program therein which may be remotely advanced or reversed in frame increments, a control system for synchronizing an audio tape with the photographic program regardless of tape speed and direction comprising: a magnetic tape player having a multiple pole head, for audio program and control signal detection, a play switch, modulated programmed reset switches, cue and review switches for controlling the tape drive motor, a tape having an audio track on which is recorded the audio program to be synchronized with the photographic program and having a signal track on which has been recorded a tape stop modulatible tone and a projector frame change tone, a logic circuit connected in circuit with a signal pole of said tape head, the tape drive motor and adapted to be connected to the reversible visual projector, so that if the play switch is closed actuating the tape motor and magnetic tape player, and the detected control signal is a tape stop tone, the logic circuit identifies it and opens the power supply line to the tape drive motor causing the tape player to stop, said reset switches being in circuit with said tape drive motor so that said tape drive motor cannot be restarted until the proper reset switch as programmed by the stop tone modulation is closed, if the detected control signal is a frame change tone said logic identifies it and sends a frame advancing signal to said visual projector to advance the photographic program one frame, upon closing said play and cue switches and said detected control signal is a frame change tone said logic identifies it and sends an advance command to the visual projector to advance the photographic program one frame and to the tape drive motor to pause while photographic program advances one frame, said logic ignoring tape stop modulatible tones, when play and cue switches are closed; upon closing said play and review switches and said detected control signal is a frame change tone said logic identifies it and sends a reverse command to the visual projector to reverse the photographic program one frame and to said tape drive motor to pause while photographic program reverses one frame, said logic ignoring tape stop modulatible tones when play and review switches are closed, upon play and cue switches remaining closed and said detected control signals are frame change tones said logic identifies them and sends advance commands to the visual projector to advance the photographic program one frame simultaneously causing said tape drive motor to pause while said photographic program advances one frame as each control signal is detected, said logic ignoring tape stop modulatible tones; upon play and review switches remaining closed and said detected control signals are frame change tones said logic identifies them and sends reverse commands to the visual projector to reverse the photographic program one frame simultaneously causing said tape drive motor to pause while said photographic program reverses one frame as each control signal is detected, said logic ignoring tape stop modulatible tones; said logic including a clock, counters, comparator and a control signal preamplifier in circuit with said tape drive motor and visual projector, said switches and multiple pole head, whereby said control signal detected by said multiple pole head and fed to said control signal preamplifier which feeds two counters in circuit with one another so that upon receipt of a tape stop modulatible tone counter one is at positive logic level and counter two is zero logic level and upon receipt of a frame change tone counter one and counter two are both positive logic level which through said comparator controls the tape drive motor and the visual projector by the programming and sequencing of said switches, said clock causing all logic circuit operations to be synchronous and not subject to transient interference.

2. A system as claimed in claim 1 wherein the control signal tones are laid down, (recorded) on the tape at the same constant tape speed as is the audio and the tape stop tone is of the order of 150 Hz and the projector frame change tone is of the order of 1000 Hz each tone being recorded for 0.45 seconds of a second thereby providing a stop tone burst of 67.5 pulses and a frame change tone burst of 450 pulses.

3. A system as claimed in claim 1 wherein tone identification after detection and amplification is accomplished by digital logic, irrespective of tape speed or direction.

4. The method of logically controlling an audio visual program by magnetic tape comprising:
   a. preparing a tape having two tracks, one of which carries an audio program to describe the visual program and a signal track which carries two detectable control tones one of which is a tape stop tone and the other of which is a projector frame change tone, and said tape being driven by a drive motor having off time during which the tape drive stops momentarily while the visual program changes one frame,
   b. subjecting the detected signal control tones of the signal track to a digital logic circuit with combinations of play, review and cue switch closures which provide a first and second operating mode for the digital circuit, said digital circuit in a first mode controlling the audio program on the tape in sync with the projector frame presentation regardless of tape speed or direction, and
   c. in a second mode to provide adjustable and automatic control of the "off" time, of the drive motor during advance or reverse signals allowing the control of projectors with differing operating speeds and characteristics to complete an operation while searching the tape in high speed either varying or constant, either forward or reverse.

5. The method of claim 4 wherein the tape signal track command tones are recorded on the tape for a specific length of time in two distinct and widely separated frequencies for positive identification regardless of tape speed or direction.

6. The method of claim 4 wherein the two separate frequencies are 150 Hz for tape control and 1000 Hz for projector frame control each being recorded on the control track for 0.45 sec at the same constant tape speed as is the audio thereby providing a tape control tone burst of 67.5 pulses and a projector frame control tone burst of 450 pulses.

* * * * *